United States Patent

[11] 3,615,722

[72] Inventors Floyd E. Kurtz
Bethesda, Md.;
Arjen Tamsma; Michael J. Pallansch,
Arlington, Va.
[21] Appl. No. 6,921
[22] Filed Jan. 29, 1970
[45] Patented Oct. 26, 1971
[73] Assignee The United States of America as represented by the Secretary of Agriculture

[54] FILTERING AIR ENTERING A SPRAY-DRYER THROUGH ACTUATED CHARCOAL IN THE PREPARATION OF SPRAY DRIED WHOLE MILK
4 Claims, No Drawings

[52] U.S. Cl. .......... 99/203, 99/56
[51] Int. Cl. .......... A23c 1/04
[50] Field of Search .......... 99/203, 56

[56] References Cited

OTHER REFERENCES

Kurtz, Tamsma, and Pallansch " Effect of Filtering Ozone-Polluted Dryer Air Through Activated Charcoal on the Flavor of Foam Spray-Dried Whole Milk" in Journal of Dairy Science, 52, 425-427, 1969.

Hall and Hedrick, Drying of Milk and Milk Products, Avi Publishing Co., Inc. (1966) pp. 59-93.

*Primary Examiner*—S. Leon Bashore
*Assistant Examiner*—Richard H. Tushin
*Attorneys*—R. Hoffman and W. Bier

ABSTRACT: An improvement in the process producing spray-dried while milk wherein the air entering the spray-dryer is filtered through activated charcoal to remove the ozone therefrom. The flavor quality of the resulting product is preserved and prevented from deteriorating, and with ozone-free air the flavor quality of the spray-dried product is the same as the milk concentrate from which it is made.

FILTERING AIR ENTERING A SPRAY-DRYER THROUGH ACTUATED CHARCOAL IN THE PREPARATION OF SPRAY DRIED WHOLE MILK

A nonexclusive, irrevocable, royalty-free license in the invention herein described, throughout the world for all purposes of the United States Government, with the power to grant sublicenses for such purposes is hereby granted to the Government of the United States of America.

The invention relates to a method of improving the flavor of spray-dried dairy products and more particularly to a method of eliminating from the spray-drying process factors responsible for loss of flavor quality.

Prior to the present invention, the standard practice in producing spray-dried dairy products was to filter the air entering the dryer through cellulose or similar type filters to remove dust and other foreign particles. However, regardless of the filter used, the flavor quality of the products was not consistent. This inability to consistently obtain a product having good flavor quality represented a serious drawback to commercial production of spray-dried dairy products.

An object of this invention is to improve the flavor of spray-dried dairy products.

Another object of this invention is to eliminate from the spray-drying process substances responsible for loss of flavor quality.

A further object is to provide a process whereby variations in product flavor and quality are eliminated and high quality spray-dried dairy products having excellent flavor characteristics are produced consistently.

We have discovered that the causative agent for the off-flavors and the resultant inconsistencies in flavor quality of spray-dried dairy products is an air pollutant, ozone. We have also discovered how to remove the ozone and eliminate its effects and consequently how to consistently produce a high quality spray-dried dairy product.

According to this invention the flavor of a milk concentrate is preserved in the spray-dried whole milk into which it is processed by replacing the standard cellulose type dust filters with activated charcoal filters. In addition to removing dust and other foreign particles from the air entering the dryer, the charcoal filters reduce the ozone level of the entering air to zero. When the air is ozone-free, a high quality product with excellent flavor characteristics is produced consistently.

Experiments were conducted to prove the effectiveness of this invention in attaining the previously stated objectives. Foam spray-dried milk was prepared from low-heat whole milk using nitrogen for foaming as described in J. Dairy Sci., 45, 27–31, 1962.

The powders were made from milk collected from a herd over a 3-day period before drying. The milk was standardized to 3.3 percent fat, heated for 15 seconds at 77° C., homogenized, and concentrated to 50 percent solids in a falling film evaporator of 100 gallons-per-hour capacity. The concentrate was fed at a rate of about 10 lbs. per minute to a modified spray dryer equipped with a pressure nozzle. The modification consisted of providing means for injecting nitrogen gas under pressure into the feed line between pump and nozzle. This was accomplished by use of a stainless steel, modified T joint in the feed line. The flow of nitrogen (57 liters per minute) was determined by use of a high-pressure flow meter and manually controlled by a needle valve in the line. Air entering the dryer at a constant rate of approximately 7,000 cu. ft. per minute and at a temperature of about 132° C. was employed in making the spray-dried powders. The temperature of the powder emerging from the spray-dryer was about 60° C. and was cooled with liquid nitrogen to about room temperature before exposure to plant air outside the dryer. The hot dried powder was fed by a star valve into a screw conveyor which carried the powder to a collecting receptacle. The whole collecting system had previously been purged of air by nitrogen flushing. Liquefied nitrogen was metered at a rate of 500 grams per minute into the conveyor to cool the powder to 26.7° C. as described in J. Dairy Sci., 50, 1873–1877, 1967.

The experiments to obtain the data shown in tables 1 and 2 were conducted as follows: Using standard cellulose dust filters, milk powder from 11 kg. of milk concentrate was discarded so that the dryer would be clear of any preceding powder. Then powder sample A, without screening and with a minimum of exposure to air, was collected directly in a container which was immediately capped until the powder was reconstituted for tasting. The cellulose filters were replaced with activated charcoal filters, powder from 33 kg. of concentrate was discarded as above, powder from 11 kg. of concentrate was collected in a milk can and then powder sample B–1, without screening and with a minimum of exposure to air, was collected directly in a container which was immediately capped. The powder collected in the milk can was held for 20–25 minutes in the capped can, screened in the surrounding ozone polluted air and then stored in a capped container until reconstituted. This was sample B–2. The charcoal filters were then replaced with cellulose filters and powder sample C collected directly in a jar after discarding powder from 33 kg. of milk concentrate.

Each of the activated charcoal filters used in the experimental work contained 45 lbs. of charcoal, had a rated capacity for the passage of air of 1,000 cu. ft. per minute, and was approximately 2 ft. high, 2 ft. wide and 8¾ inches deep. Since each filter was folded a number of times and in such a manner that it was like a layered series of filters with each layer containing part of the total 45 lbs. of charcoal, the depth of 8¾ inches was not solid charcoal. In order to cover the air inlet opening in the dryer used in the experimental work described in this application, nine of the activated charcoal filters were used.

Filter changes took 10–15 minutes and during this time water instead of the concentrate was fed into the dryer. Measurements of ozone in the incoming dryer air were made as previously described (J. Dairy Sci., 52, 158, 1969) with the inclusion of a chromium trioxide scrubber for removing sulfur dioxide. Milks were reconstituted from the powder samples and refrigerated overnight. The flavor of these milks was then evaluated by a trained taste panel using a 10-point scoring range of 31–40 (J. Dairy Sci., 49, 628, 1966). All powders were tasted in duplicate. Samples of the original milk concentrate were taken at the beginning and at the end of each experiment, and their scores, which were in very close agreement, averaged for the flavor score shown in tables 1 and 2.

As shown in table 1 a marked improvement in flavor quality is obtained when the incoming ozone-polluted air is filtered through activated charcoal. Using cellulose filters (powders A and C) the ozone level in the dryer varied from 4 to 17 ppb, and from 0.6 to 4.0 flavor points were lost in the drying process. In contrast, using charcoal filters the ozone levels were reduced to zero and the flavor scores varied from 0.2 higher to 0.7 lower than the concentrates.

When the powder was cooled before exposure to polluted air, subsequent exposure incident to screening and packaging did not have an adverse effect on the flavor score as shown in table 2.

In order to determine whether low levels of ozone in otherwise pure air cause flavor damage, two experiments involving four milk powders each as shown in table 3 were conducted. Powder D was made with the addition of ozone in the incoming dryer air between the charcoal filter and the blower. Powder E was made in the same way as D except that a lower level of ozone was added. Powder F was made using charcoal filters but with no added ozone. Powder G was made using standard cellulose filters with no added ozone. As in previous experiments sufficient powder was discarded between each collection to clear the dryer of the preceding powder. These powders, along with milk concentrate samples collected at the beginning and end of each experiment were evaluated as described above. In addition to showing that low levels of ozone in otherwise pure air do substantially damage the flavor of dried milk, table 3 also shows that the process of this invention is very effective in preventing flavor deterioration in spray dried whole milk. When charcoal filters are used and no ozone added, the flavor of the dried product is essentially the same as that of the original milk concentrate.

The process described herein for spray-dried whole milk is also applicable to skim milk and to other dairy products.

TABLE 1.—EFFECT ON FLAVOR OF FOAM SPRAY-DRIED WHOLE MILK OF USING ACTIVATED CHARCOAL FILTERS TO REMOVE OZONE FROM DRYER AIR

| Experiment No. | Milk concentrate,[1] flavor score | Milk powder | | | |
|---|---|---|---|---|---|
| | | A+C | | B-1 | |
| | | Ozone level, p.p.b. | Flavor score[2] | Ozone level, p.p.b. | Flavor score |
| 1 | 37.0 | 7 | 34.9 | 0 | 37.0 |
| 2 | 37.4 | 5 | 36.7 | 0 | 37.3 |
| 3 | 37.4 | 17 | 33.4 | 0 | 36.7 |
| 4 | 37.5 | 6 | 36.0 | 0 | 37.3 |
| 5 | 37.1 | 11 | 34.2 | 0 | 37.3 |
| 6 | 37.3 | 6 | 35.4 | 0 | 37.2 |
| 7 | 37.3 | 4 | 36.7 | 0 | 37.3 |

[1] Original milk concentrate from which powders A, C and B-1 were prepared.
[2] Average of powder samples A and C.

TABLE 2.—EFFECT OF EXPOSURE TO POLLUTED AIR ON FLAVOR OF FOAM SPRAY-DRIED WHOLE MILK MANUFACTURED IN OZONE-FREE AIR

| Experiment No. | Milk concentrate,[1] flavor score | Milk powder | | | |
|---|---|---|---|---|---|
| | | B-1 | | B-2 | |
| | | Ozone level in charcoal purified air, p.p.b. | Flavor score | Ozone level in polluted plant air, p.p.b. | Flavor score |
| 1 | 37.0 | 0 | 37.0 | 7 | 37.0 |
| 2 | 37.4 | 0 | 37.3 | 5 | 37.6 |
| 3 | 37.4 | 0 | 36.7 | 17 | 36.7 |
| 4 | 37.5 | 0 | 37.3 | 6 | 37.1 |
| 5 | 37.1 | 0 | 37.3 | 11 | 37.3 |

[1] Original milk concentrate from which powders B-1 and B-2 were prepared.

TABLE 3.—EFFECT OF OZONE IN NATURALLY AND ARTIFICIALLY CONTAMINATED DRYER AIR ON FLAVOR OF FOAM SPRAY-DRIED MILK

| Experiment No. | Milk concentrate, flavor score | Milk powders | | |
|---|---|---|---|---|
| | | Ozone level of dryer air, p.p.b. | Powder | Flavor score |
| 1 | 37.3 | 10 | D | 33.8 |
| | | 2 | E | 36.7 |
| | | 0 | F | 37.2 |
| | | 6 | G | 35.4 |
| 2 | 37.3 | 12 | D | 35.0 |
| | | 6 | E | 36.1 |
| | | 0 | F | 37.3 |
| | | 4 | G | 36.7 |

We claim:
1. In a process for the preparation of spray-dried dairy products wherein nitrogen gas is incorporated into a liquid dairy product concentrate at high pressure prior to spraying into a dryer into which air at a temperature of about 132° C. enters at a constant rate of about 7,000 cu. ft. per minute, the improvement which consists of filtering said entering air through an activated charcoal filter.
2. The process of claim 1 in which the liquid dairy product concentrate is concentrated whole milk.
3. The process of claim 1 in which the liquid dairy product concentrate is concentrated skim milk.
4. The process of claim 1 in which the activated charcoal filter reduces the ozone level of the air entering the spray-dryer to zero.